United States Patent [19]

Hosokoshi et al.

[11] 3,988,777

[45] Oct. 26, 1976

[54] COLOR PICTURE TUBE

[75] Inventors: Kakuichiro Hosokoshi, Neyagawa; Hiroto Nakamura; Akira Sato, both of Takatsuki, all of Japan

[73] Assignee: Matsushita Electronics Corporation, Kadoma, Japan

[22] Filed: Mar. 11, 1975

[21] Appl. No.: 557,372

[30] Foreign Application Priority Data

Mar. 13, 1974 Japan ................................ 49-29376

[52] U.S. Cl. .................................. 358/65; 313/403; 313/408; 313/470; 354/1

[51] Int. Cl.[2] ..................... H04N 9/20; G03B 41/00; H01J 29/80; H01J 29/10

[58] Field of Search ........... 313/470, 471, 472, 461, 313/408, 403; 358/65, 64, 60; 354/1

[56] References Cited

UNITED STATES PATENTS

| | | | |
|---|---|---|---|
| 2,957,940 | 10/1960 | Cusano | 358/60 |
| 3,840,881 | 10/1974 | Koizumi et al. | 313/470 |
| 3,844,005 | 10/1974 | Yamada et al. | 313/403 |
| 3,882,347 | 5/1975 | Suzuki et al. | 313/408 |
| 3,889,145 | 6/1975 | Suzuki et al. | 313/470 |
| 3,890,527 | 6/1975 | Patel et al. | 313/472 |
| 3,892,995 | 7/1975 | Yamazaki | 313/472 |
| 3,900,854 | 8/1975 | Osakabe et al. | 354/1 |

*Primary Examiner*—John C. Martin
*Attorney, Agent, or Firm*—Cushman, Darby & Cushman

[57] ABSTRACT

A color picture tube, wherein a set of three electron beams emitted from respective three electron-emitting members of an in-line type electron gun, or from respective three electron guns, is projected through slot-shaped apertures of a shadow mask onto a screen, and sets of each three luminous strips are formed separated from each other and surrounded by light absorbing black film, and the three electron beams selectively energize the luminous strips to emit luminous color images, the length and width of the slots on the shadow mask and those of the phosphor strips having specified correlations in the central part of the picture screen and the shadow mask, and different correlations in the corner parts of the screen and the shadow mask so that color picture reproduction in contrast, brightness and color balance is satisfactory over the entire screen.

5 Claims, 9 Drawing Figures

FIG.5.
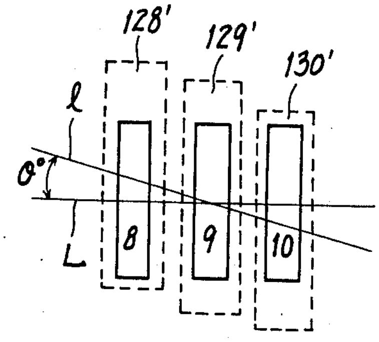
FIG.6.(a)
Central part
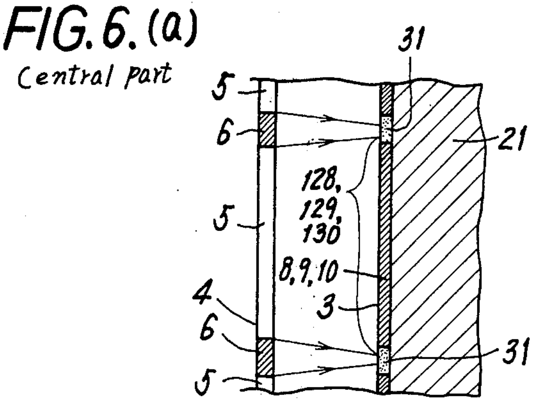
FIG.7. (Prior out)
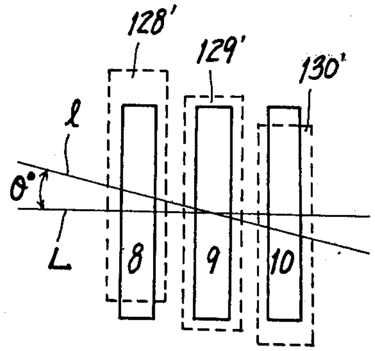
FIG.6.(b)
Corner part
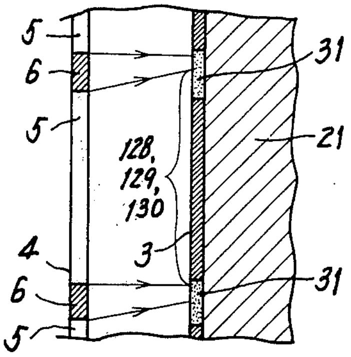
FIG.8.
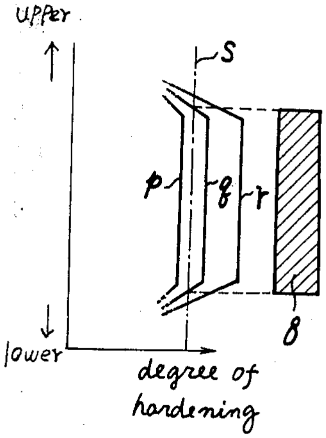

COLOR PICTURE TUBE

BACKGROUND OF THE INVENTION

This invention relates to an improvement of a color picture tube, wherein a set of three electron beams for emitting red, green and blue images, respectively, is emitted from a three-beam in-line type electron gun, and passing through vertically oblong slots of a shadow mask, is led to a black matrix-type screen standing behind the shadow mask so as to energize selectively any of three color-luminous strips which form a set of each three colors on said screen to correspond to said set of three electron color-beams and to produce desired color images.

Apertures of the shadow mask of a color picture tube of this type characterizing the vertically slotted mask as described above are formed in vertically oblong slots. Consequently, as compared with the ordinary-type color picture tubes employing masks having ordinary round apertures, it is already known that this type of tube with slot apertures can select larger areas of apertures for the mask. Accordingly, not only does it reduce electricity wastefully consumed by a portion of electrons striking the mask and failing to pass through it, but also it is able to produce bright pictures on the screen. Besides, it has the advantage of being almost free from color derangement in the vertical direction even in case of thermal expansion of the shadow mask.

However, in the known construction of this type of color picture tube, its screen has a form of massed parallel vertical stripes of red, green and blue luminous strips alternately arranged to emit lights of the respective colors when energized. Furthermore, the light-absorbing film placed in the gaps between the luminous strips for the purpose of improving the contrast serves only to form vertical stripes on the screen. Therefore, it entails a shortcoming in that pictures coming out on the screen are deteriorated by the presence of distinct vertical stripes. On the other hand, slots on the shadow mask have bridging parts between shorter sides of the upper and lower slots, which bridges cause corresponding shadow to be seen as gaps in electron-excited light-irradiating stripes. Such gaps are the parts not excited by the electron beam, and accordingly, do not irradiate light but remain as non-irradiating gray or white parts. The non-irradiating gray or white parts reflect the room light and look white or gray, thereby reducing color purity of the picture.

In order to overcome the abovementioned shortcomings, an invention by Kakuichiro HOSOKOSHI was made and applied for patent by Matsushita Electronics Corporation as follows:

| Country | Application No. | Filing date |
|---|---|---|
| USA | 475,271 | May 31, 1974 (now abandoned) |
| UKGB | 26290/74 | June 13, 1974 |
| West Germany | P24 28 664.4 | June 14, 1974 |
| France | 74/20947 | June 17, 1974 |
| Canada | 202,582 | June 17, 1974 |

In addition, Japanese Pat. application No. 69545/73 was filed on June 18, 1973.

In the abovementioned invention of Kakuichiro HOSOKOSHI, a light absorbing dark film is applied to fill in the gaps between the adjacent shorter sides of phosphor strips, thereby isolating the upper and lower phosphor strips with black gap bands.

SUMMARY OF THE INVENTION

The present invention purports to provide an improved color picture tube capable of performing satisfactory contrast of picture, brightness, and color balance.

BRIEF EXPLANATION OF THE DRAWING

FIG. 5 is an enlarged front view of a corner part of the picture screen of a color picture tube of FIG. 1.

FIG. 6 (*a*) and (*b*) are enlarged sectional side views of a central part and a corner part, respectively, each showing relations among a face panel, the picture screen, the phosphor strips, the shadow mask, slots of the shadow mask and electron beam.

FIG. 7 is an enlarged front view of a corner part of a known picture screen of a color picture tube having strip-shaped phosphor dots and a shadow mask with strip shaped slots.

FIG. 8 is a graph showing degree of hardening of a phosphor strip for various intensity of exposing light.

DETAILED DESCRIPTION OF THE PRESENT INVENTION

The present invention relates to an improvement in a color picture tube having on the inner wall of the screen face, vertical strip-shaped phosphor dots surrounded by light-absorbing film and a shadow mask with vertical strip-shaped slots.

The present invention is characterized in that the length and width of the slots on the shadow mask and those of phosphor strips have a specified relation in the central part of the picture screen and the shadow mask, and have different specified relations in the corner parts of the screen and the shadow mask.

Figure 1:
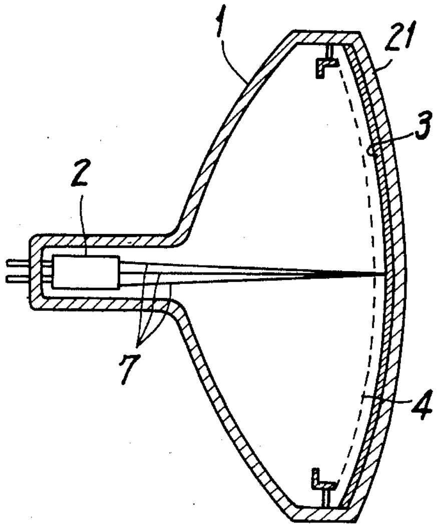
FIG. 1 is a sectional plan-view of a color picture tube according to the present invention.
Figure 2:
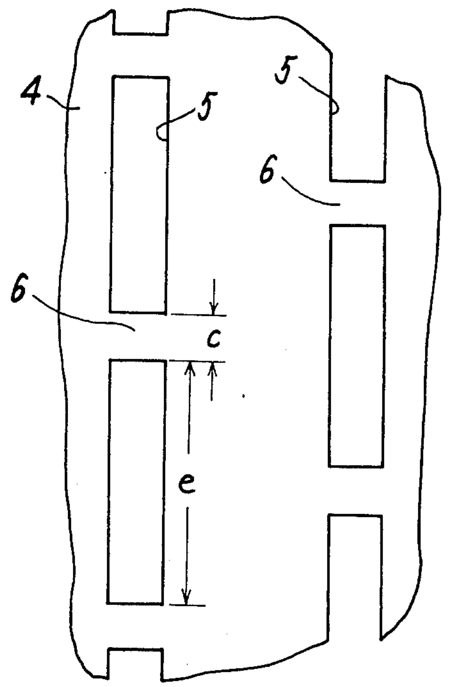
FIG. 2 is a fragmental enlarged front-view of a shadow mask of the color picture tube of FIG. 1.

In FIG. 1, the vacuum enclosure 21 of, for instance, a glass bulb encloses three unit-electron guns 2 of in-line type in its neck part, a shadow mask 4 positioned with a specified gap from the inner face of the face panel 3 and a picture screen on the inner face of the face panel 3. As shown in FIG. 2, the shadow mask 4 has many slots 5,5 . . . arranged in vertical rows, which vertical rows are arranged in parallel side by side to form multiple rows. Bridge parts 6 of a specified width *c* separate the adjacent upper and lower slots in a vertical row.

Figure 3:
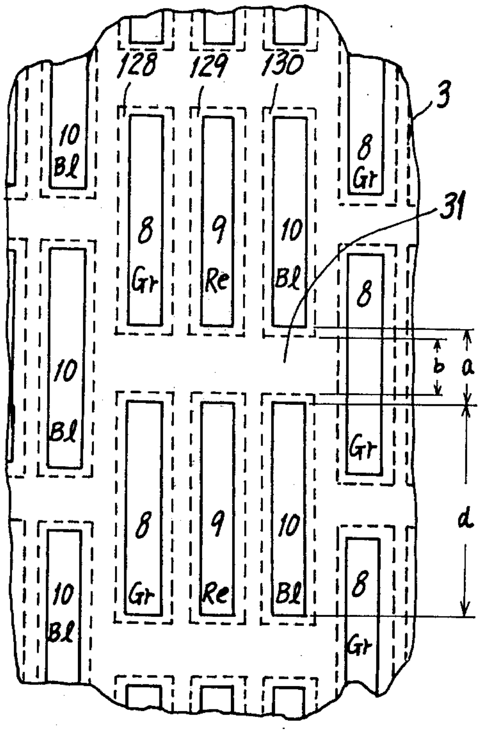
FIG. 3 is a fragmental enlarged front-view of a picture screen of the color picture tube of FIG. 1.

Three electron beams emitted from three electron emitting means, which are arranged in line, and passing through and crossing at each vertically oblong slot 5 of the shadow mask produce three vertically oblong beam spots 128, 129 & 130 as shown in FIG. 3. On the picture screen 3, at the positions superposing on the beam spots 128, 129 & 130, vertically oblong phosphor strips 8, 9 and 10 for different color emissions, for instance, green emission, red emission and blue emission, are formed, respectively. The three kinds of phosphor strips constitute one set of phosphor strips corresponding to each slot 5, and similar sets are provided for all slots 5. The phosphor strips are surrounded by the light-absorbing film 31, which fills spaces between all phosphor strips. The light-absorbing film consists mainly of graphite powder and binding substance.

The electron beam, after passing through each slot, diverges to some extent, and accordingly, the size of the beam spot on the picture screen is larger than that of the slot by some degree.

In the present invention, the sizes of the phosphor strips are carefully selected in order to attain good picture performance. It is known in a round-aperture shadow mask color-picture tube of prior arts that, by selecting the phosphor dots on the picture screen to be smaller than the beam spots on the screen, and by surrounding the phosphor dots with a light-absorbing film, a good registration, i.e., matching of phosphor dots with proper electron beams is obtainable. However, in a color picture tube of the type having a shadow mask with vertically oblong slots, the sizes of the apertures should be carefully considered. Namely, widths and lengths of the oblong electron beam spots and slots must be considered separately.

In the picture tube of the present invention having vertically oblong slots on the shadow mask and vertically oblong phosphor strips 8, 9 and 10 on the picture screen 3, sufficiently small phosphor strips in comparison with the corresponding slots 5 would result in attainment of less mis-shooting by electron beams of the adjacent phosphor strips, hence less color derangement caused by thermal expansion of the shadow mask 4 and/or adverse effect of environmental magnetic field such as geomagnetism. However, too small phosphor strips result in loss of brightness of the picture.

When the slots 5 of the shadow mask move in a horizontal direction, the electron beams shoot on adjacent left or right phosphor strips, which are of different color emission, and therefore, derange color representation. However, when the slots 5 move in a vertical direction, the electron beams shoot adjacent upper or lower phosphor strips which are of the same color emission, and therefore, produce no color impurity.

Generally speaking, the moving of the slots 5 from preset positions due to thermal expansion of the shadow mask is little in the central part of the shadow mask 4 and is large in the off-center or outskirt corner parts of the shadow mask. The shift of the beam spots from preset positions due to the geomagnetism is large also in the corner parts of the picture screen 3.

In the present invention, the widths, i.e., the horizontal sizes of the phosphor strips are selected to be smaller than those of the corresponding slots of the mask by specified width differences. It is preferable that the width-difference is smaller in the central part of the picture screen and becomes gradually larger towards the outskirt parts, in view of the aforementioned reason.

The lengths, i.e., the vertical sizes of the phosphor strips are selected to be considerably different between in the central part and in the outskirt or corner parts. It is empirically found that in the central part, the length of the phosphor strips should be selected to be larger than the length of the slots 5 and shorter than the length of the beam spots as shown in FIG. 6 (*a*). More particularly, experiments show that the length of phosphor strips of 1.00 time to 1.10 times the length of the corresponding slots results in satisfactory color reproduction and brightness.

In the corner parts of the picture screen in the prior art, due to the curvature of the picture screen and to unavoidable error of the electron-beam deflecting means, as shown in FIG. 7 in a set of the beam spots 128', 129' & 130' formed by the beams, which shoots through one of the slots 5 and lands on the screen, the beam spots are obliquely arranged, so that the centers of the beam spots are on an oblique line with a shift angle $\theta^{\circ}$ to the horizontal line. Due to such vertical shifting of the landing beams, the phosphor strips 8 and 10 on both sides are not perfectly covered by the electron beam spots 128' and 130', respectively, while only the center phosphor strip 9 perfectly matches the beam spot 129'. Therefore, in the corner parts, a certain color, for instance, in the example shown in FIG. 7, red emission becomes brighter than other two colors, resulting in shifting the white-balancing of color to reddish one.

In the present invention, in order to avoid the above-mentioned shortcomings, the length of the phosphor strip in the corner parts is selected to be smaller than that of slot as shown in FIG. 6 (*b*), but is preferably not smaller than 0.8 times the length of slot. For a length smaller than 0.8 times that of slot, the brightness decreases exceeding allowable limit.

Figure 4:
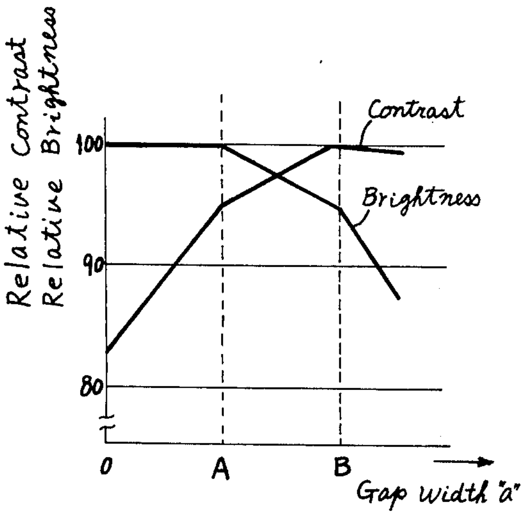
FIG. 4 is a graph showing the relation of vertical gap *a* shown in FIG. 3, between adjacent upper and lower phosphor strips against picture contrast and brightness.

FIG. 4 shows the relation between the width "a" of the gap between the upper and lower phosphor strips shown in FIG. 3 in a vertical row. Namely, the larger the gap width is, the larger the contrast and the smaller the brightness are. As shown in FIG. 4, in a range between the points A and B, an optimum value of the gap *a* can be found.

The point A indicates a case where the gap width *a* between the phosphor strips is equal to the gap width *b* between the upper and lower beam spots shown in FIG. 3.

The point B indicates a case where the length *d* of the phosphor strips 8, 9 or 10 is equal to the length *e* of the slot 5 shown in FIG. 2.

In general, brightness and contrast of a color picture tube are evaluated mainly by its characteristics in the central part of the picture screen, where good registration between the phosphor strips and the slots, hence little color derangement occurs.

According to this invention, the length and widths of the phosphor strips are smaller in the corner parts than in the central part. Thus, the brightness in the corner parts decreases from that in the central part, but the decrease is generally allowable for actual performance. Therefore, by means of the aforementioned limiting of the length *d* of the phosphor strips to be smaller than the slot length *e* but preferably not smaller than 0.8 times the slot length *e*, noticeable inbalance in reproducing white color in the corner parts can be eliminated.

Furthermore, by selecting the number of phosphor strips in vertical direction to be more than 100, unpleasant vertical stripes in the picture screen become negligibly faint.

In the actual manufacturing process, in order to desirably control the gap width *a*, a scheme of moving or swinging the light source in a direction parallel to lengthwise direction of the slots during each exposure for forming phosphor strips may be employed.

In the actual manufacturing process, by employing a known light attenuator with a preset attenuation pattern, desired control of the length of phosphor strips in the corner parts can be made.

Namely, a light attenuating means is inserted between a light source and the shadow mask 4 during an exposure process. The light attenuating screen has such a pattern that the corner parts of the picture screen are less exposed than the central part. Then, the light source is swung in the direction parallel to the lengthwise direction of the slots during the exposure through the shadow mask. By means of the abovementioned swinging, the upper and lower end parts of the phosphor strips receive sloped exposure by the light, and therefore, the degree of hardening on both end parts has a slope as shown in FIG. 8. In FIG. 8, various degrees of exposure indicated by curves *p*, *q* and *r* are obtainable by varying the intensity of light exposure on that part. Therefore, by appropriately controlling the light intensity of the corner parts by means of known suitable light attenuator (not shown) having a specified pattern of attenuation, desired slopes of hardening as of the curves of FIG. 8 are obtainable. Then, the exposed phosphor-containing slurry is developed by known developing process. In the process, provided that the exposure is made so as to result in a hardening curve *q* and also provided that by controlling the developing process in such a manner that for the exposed region having the degree of hardening exceeding a level indicated by the chain line *s*, the selected region 8 of a desired length shown in FIG. 8 is formed as a phosphor strip. As elucidated in the foregoing, the length of the phosphor strip can be controlled by the degree of exposure, hence the degree of hardening of the phosphor slurry. Namely, the length of the phosphor strip is controlled by suitably selecting the attenuation pattern of the attenuation filter and the developing condition.

EXAMPLE

In an 18 inch type (namely, about 45cm-diagonal size) color picture tube,

In the shadow mask 4:

slots 5 are 0.2mm wide × 0.8mm long, and are arranged as shown in FIG. 2 in vertical rows with 0.95mm pitch, hence bridge width *c* being 0.15mm, and in horizontal alignments with 0.75mm pitch.

On the picture screen 3:

beam spots 128, 129 or 130 are 0.225mm wide × 0.9mm long, phosphor strips in the central part are 0.18mm wide × 0.85mm long and are arranged as shown in FIG. 3.

phosphor strips in the corner parts are 0.11mm wide × 0.78mm long and are arranged as shown in FIG. 3, and each phosphor strip is surrounded by light-absorbing film.

The abovementioned color picture tube has satisfactory performance in color purity and white-balance contrast and brightness in all parts of the picture screen.

In actual embodiments, the slots as well as the phosphor strips may be formed in long ellipse or oblong rectangle with semicircular ends.

What is claimed is:

1. A color picture tube comprising:

a vacuum enclosure having a face panel, a shadow mask having a number of oblong slots which are arranged in lengthwise rows as well as in widthwise alignments, the shadow mask being disposed in said vacuum enclosure with a specified gap from the inner wall of said face panel, a picture screen formed on said inner wall of said face panel and having a number of oblong phosphor strips forming phosphor strip sets, each consisting of specified kinds of phosphor strips disposed side by side, each of said oblong slots facing each set of said phosphor strips, and an electron-gun assembly including three electron-gun units disposed in line in said enclosure in a direction so that three electron beams emitted therefrom shoot on the picture screen after crossing each other at a spot on said shadow mask, and characterized in that:

in all parts of the picture screen and the shadow mask, the widths of the phosphor strips are smaller than those of the slots, in central part of the picture screen and the shadow mask, the length of the phosphor strips is longer than the length of the slots, but is shorter than that of beam spots landing on the picture screen, and in outskirt corner parts of the picture screen and of the shadow mask, the length of said phosphor strips is shorter than the length of the slots.

2. A color picture tube of claim 1, wherein the difference function formed by subtracting the width of the phosphor strips from the width of the slots is larger in said outskirt corner parts than in said central part.

3. A color picture tube of claim 1, wherein, in said outskirt corner parts, the length of said phosphor strips is not less than 0.8 times the length of said slots.

4. A color picture tube of claim 1, wherein each of said lengthwise rows consists of at least one hundred phosphor strips.

5. A method of making a color picture tube comprising a picture screen having a number of oblong phosphor strips the sizes of which differ for different parts of the picture screen, the method of determining them being characterized by the following steps:

1. during an exposure through a shadow mask having oblong slots with a light from a light source for photo-chemical hardening of a phosphor-containing slurry, moving the light source in a direction parallel to the lengthwise direction of said slots, thereby giving sloped degree of the hardening to both end parts of said oblong phosphor strips, and controlling the light intensity distribution thereby giving desired exposure degree pattern on the picture screen, and
2. controlling the conditions of developing the exposed phosphor-containing slurry in a manner to obtain phosphor strips of a smaller size than that of the slots by selectively dissolving at least a part of the exposed area which is under a selected degree of hardening.

* * * * *